United States Patent
Leibovitz (10) Patent No.: US 8,320,143 B2
(45) Date of Patent: Nov. 27, 2012

(54) BRIDGE SYNCHRONOUS RECTIFIER

(75) Inventor: Alfred Leibovitz, Petach Tikva (IL)

(73) Assignee: Powermat Technologies, Ltd. (IL)

(*) Notice: Subject to any disclaimer, the term of this patent is extended or adjusted under 35 U.S.C. 154(b) by 677 days.

(21) Appl. No.: 12/423,530

(22) Filed: Apr. 14, 2009

(65) Prior Publication Data

US 2009/0257259 A1 Oct. 15, 2009

Related U.S. Application Data

(60) Provisional application No. 61/071,151, filed on Apr. 15, 2008.

(51) Int. Cl.
*H02M 5/45* (2006.01)
*H02M 5/451* (2006.01)
*H02M 5/458* (2006.01)

(52) U.S. Cl. ............... 363/89; 363/69; 363/127

(58) Field of Classification Search ............ 363/67, 363/69, 71, 76, 77, 84, 85, 88, 125, 127, 363/128, 89
See application file for complete search history.

(56) References Cited

U.S. PATENT DOCUMENTS

| | | | | |
|---|---|---|---|---|
| 3,207,975 A | * | 9/1965 | Pintell | 323/235 |
| 3,771,085 A | | 11/1973 | Hojo et al. | |
| 3,938,018 A | | 2/1976 | Dahl | |
| 4,139,880 A | * | 2/1979 | Ulmer et al. | 361/246 |
| 4,160,193 A | | 7/1979 | Richmond | |
| 4,319,144 A | * | 3/1982 | King et al. | 327/28 |
| 4,423,456 A | * | 12/1983 | Zaidenweber | 361/77 |
| 4,431,948 A | | 2/1984 | Elder et al. | |
| 4,473,757 A | * | 9/1984 | Farago et al. | 307/127 |
| 4,535,203 A | * | 8/1985 | Jenkins et al. | 379/333 |
| 4,754,180 A | | 6/1988 | Kiedrowski | |
| 4,831,508 A | * | 5/1989 | Hunter | 363/44 |
| 4,977,515 A | | 12/1990 | Rudden et al. | |
| 5,119,285 A | * | 6/1992 | Liu et al. | 363/127 |
| 5,221,877 A | | 6/1993 | Falk | |
| 5,278,771 A | | 1/1994 | Nyenya | |

(Continued)

FOREIGN PATENT DOCUMENTS

EP 0160990 A2 11/1985

(Continued)

OTHER PUBLICATIONS

Liu et al. "An Analysis of Double-layer Electromagnetic Shield for a Universal Contactless Battery Charging Platform", IEEE 2005, p. 1767-1772.

(Continued)

*Primary Examiner* — Gary L Laxton
*Assistant Examiner* — Nusrat Quddus
(74) *Attorney, Agent, or Firm* — Brooks Kushman P.C.

(57) ABSTRACT

A current-triggered synchro-rectifier comprising an electronic switch configured to be in its ON setting when the current flowing through its cathode exceeds a predetermined threshold. The electronic switch may include a half-wave rectifier wired to the source terminal and the drain terminal of a MOSFET device, and a current monitor configured to monitor the drain-current flowing through the drain terminal. The current monitor sends a gate signal to the gate terminal such that the MOSFET is switched to its ON state when the drain-current exceeds a first threshold current and the MOSFET is switched to its OFF state when the drain-current falls below a second threshold current. Usefully, the synchro-rectifier may be incorporated into a full-wave rectifier.

18 Claims, 4 Drawing Sheets

U.S. PATENT DOCUMENTS

| | | | |
|---|---|---|---|
| 5,367,242 A | 11/1994 | Hulman | |
| 5,455,466 A | 10/1995 | Parks et al. | |
| 5,486,394 A | 1/1996 | Stough | |
| 5,528,113 A | 6/1996 | Boys et al. | |
| 5,550,452 A | 8/1996 | Shirai et al. | |
| 5,600,225 A | 2/1997 | Goto | |
| 5,680,035 A | 10/1997 | Haim et al. | |
| 5,713,939 A | 2/1998 | Nedungadi et al. | |
| 5,734,254 A | 3/1998 | Stephens | |
| 5,762,250 A | 6/1998 | Carlton et al. | |
| 5,821,728 A | 10/1998 | Schwind | |
| 5,821,731 A | 10/1998 | Kuki et al. | |
| 5,870,031 A * | 2/1999 | Kaiser et al. | 340/10.34 |
| 5,907,285 A | 5/1999 | Toms et al. | |
| 5,929,598 A | 7/1999 | Nakama et al. | |
| 5,949,214 A | 9/1999 | Broussard et al. | |
| 6,042,005 A | 3/2000 | Basile et al. | |
| 6,078,512 A * | 6/2000 | Bouvier | 363/127 |
| 6,127,799 A | 10/2000 | Krishnan | |
| 6,211,649 B1 | 4/2001 | Matsuda | |
| 6,230,029 B1 | 5/2001 | Hahn et al. | |
| 6,349,047 B1 * | 2/2002 | Yu | 363/127 |
| 6,396,935 B1 | 5/2002 | Makkonen | |
| 6,436,299 B1 | 8/2002 | Baarman et al. | |
| 6,441,589 B1 | 8/2002 | Frerking et al. | |
| 6,484,260 B1 | 11/2002 | Scott et al. | |
| 6,532,298 B1 | 3/2003 | Cambier et al. | |
| 6,586,909 B1 | 7/2003 | Trepka | |
| 6,624,616 B1 | 9/2003 | Frerking et al. | |
| 6,644,557 B1 | 11/2003 | Jacobs | |
| 6,673,250 B2 | 1/2004 | Kuennen et al. | |
| 6,721,540 B1 | 4/2004 | Hayakawa | |
| 6,731,071 B2 | 5/2004 | Baarman | |
| 6,766,040 B1 | 7/2004 | Catalano et al. | |
| 6,825,620 B2 | 11/2004 | Kuennen et al. | |
| 6,888,438 B2 | 5/2005 | Hui et al. | |
| 6,894,457 B2 | 5/2005 | Germagian et al. | |
| D519,275 S | 4/2006 | Shertzer | |
| 7,043,060 B2 | 5/2006 | Quintana | |
| 7,126,450 B2 | 10/2006 | Baarman et al. | |
| 7,132,918 B2 | 11/2006 | Baarman et al. | |
| 7,164,255 B2 | 1/2007 | Hui | |
| 7,180,248 B2 | 2/2007 | Kuennen et al. | |
| 7,180,265 B2 | 2/2007 | Naskali et al. | |
| 7,224,086 B2 | 5/2007 | Germagian et al. | |
| 7,233,319 B2 | 6/2007 | Johnson et al. | |
| D553,852 S | 10/2007 | Brandenburg | |
| 7,385,357 B2 | 6/2008 | Kuennen et al. | |
| 7,392,068 B2 | 6/2008 | Dayan et al. | |
| 7,405,535 B2 | 7/2008 | Frerking et al. | |
| 7,462,951 B1 | 12/2008 | Baarman | |
| D586,809 S | 2/2009 | Jones et al. | |
| 7,518,267 B2 | 4/2009 | Baarman | |
| 7,522,878 B2 | 4/2009 | Baarman | |
| 7,576,514 B2 | 8/2009 | Hui | |
| D599,735 S | 9/2009 | Amidei et al. | |
| D599,736 S | 9/2009 | Ferber et al. | |
| D599,737 S | 9/2009 | Amidei et al. | |
| D599,738 S | 9/2009 | Amidei et al. | |
| D603,603 S | 11/2009 | Laine et al. | |
| 7,612,528 B2 | 11/2009 | Baarman et al. | |
| D607,879 S | 1/2010 | Ferber et al. | |
| D611,407 S | 3/2010 | Webb | |
| D611,408 S | 3/2010 | Ferber et al. | |
| 2002/0057584 A1 | 5/2002 | Brockmann | |
| 2002/0158512 A1 | 10/2002 | Mizutani et al. | |
| 2003/0210106 A1 | 11/2003 | Cheng et al. | |
| 2004/0023633 A1 | 2/2004 | Gordon | |
| 2004/0195767 A1 | 10/2004 | Randall | |
| 2004/0203537 A1 | 10/2004 | Yoshida et al. | |
| 2004/0242264 A1 | 12/2004 | Cho | |
| 2004/0261802 A1 | 12/2004 | Griffin et al. | |
| 2005/0007067 A1 | 1/2005 | Baarman et al. | |
| 2005/0083020 A1 | 4/2005 | Baarman | |
| 2005/0130593 A1 | 6/2005 | Michalak | |
| 2005/0164636 A1 | 7/2005 | Palermo et al. | |
| 2005/0169506 A1 | 8/2005 | Fenrich et al. | |
| 2005/0192062 A1 | 9/2005 | Michkle et al. | |
| 2005/0233768 A1 | 10/2005 | Guo et al. | |
| 2006/0028176 A1 | 2/2006 | Tang et al. | |
| 2006/0043927 A1 | 3/2006 | Beart et al. | |
| 2006/0052144 A1 | 3/2006 | Seil et al. | |
| 2006/0061325 A1 | 3/2006 | Tang et al. | |
| 2006/0071632 A1 | 4/2006 | Ghabra et al. | |
| 2006/0091222 A1 | 5/2006 | Leung et al. | |
| 2006/0093132 A1 | 5/2006 | Desormiere et al. | |
| 2006/0202665 A1 | 9/2006 | Hsu | |
| 2007/0023559 A1 | 2/2007 | Scapillato et al. | |
| 2007/0057763 A1 | 3/2007 | Blattner et al. | |
| 2007/0076459 A1 | 4/2007 | Limpkin | |
| 2007/0136593 A1 | 6/2007 | Plavcan et al. | |
| 2007/0165371 A1 | 7/2007 | Brandenburg | |
| 2007/0182367 A1 | 8/2007 | Partovi | |
| 2007/0279002 A1 | 12/2007 | Partovi | |
| 2008/0001922 A1 | 1/2008 | Johnson et al. | |
| 2008/0030985 A1 | 2/2008 | Joen et al. | |
| 2008/0049988 A1 | 2/2008 | Basile et al. | |
| 2008/0055047 A1 | 3/2008 | Osada et al. | |
| 2008/0079388 A1 | 4/2008 | Sarnowsky et al. | |
| 2008/0132293 A1 | 6/2008 | Gundlach et al. | |
| 2008/0157715 A1 | 7/2008 | Rosenboom et al. | |
| 2008/0223926 A1 | 9/2008 | Miller et al. | |
| 2008/0258680 A1 | 10/2008 | Frerking et al. | |
| 2008/0265835 A1 | 10/2008 | Reed et al. | |
| 2009/0026959 A1 | 1/2009 | Lin et al. | |
| 2009/0040807 A1 | 2/2009 | Doumae et al. | |
| 2009/0047768 A1 | 2/2009 | Jain | |
| 2009/0047769 A1 | 2/2009 | Bhat et al. | |
| 2009/0075704 A1 | 3/2009 | Wang | |
| 2009/0079387 A1 | 3/2009 | Jin et al. | |
| 2009/0084705 A1 | 4/2009 | Justiss | |
| 2009/0097221 A1 | 4/2009 | Sayed et al. | |
| 2009/0102416 A1 | 4/2009 | Burley | |
| 2009/0134972 A1 | 5/2009 | Wu, Jr. et al. | |
| 2009/0146608 A1 | 6/2009 | Lee | |
| 2009/0153098 A1 | 6/2009 | Toya et al. | |
| 2009/0153297 A1 | 6/2009 | Gardner | |
| 2009/0174263 A1 | 7/2009 | Baarman et al. | |
| 2009/0203355 A1 | 8/2009 | Clark | |
| 2009/0212639 A1 | 8/2009 | Johnson | |
| 2009/0226050 A1 | 9/2009 | Hughes | |
| 2009/0243791 A1 | 10/2009 | Partin et al. | |
| 2009/0251102 A1 | 10/2009 | Hui | |
| 2009/0273891 A1 | 11/2009 | Peiker | |
| 2009/0278494 A1 | 11/2009 | Randall | |
| 2010/0039066 A1 | 2/2010 | Yuan et al. | |

FOREIGN PATENT DOCUMENTS

| | | |
|---|---|---|
| EP | 0160990 B1 | 1/1991 |
| EP | 0558316 A1 | 9/1993 |
| EP | 1990734 A1 | 11/2008 |
| GB | 2399466 A | 9/2004 |
| GB | 2399466 B | 11/2005 |
| GB | 2429372 A | 2/2007 |
| WO | 9602879 A1 | 2/1996 |
| WO | 0201557 A1 | 1/2002 |
| WO | 0215320 A1 | 2/2002 |
| WO | 2005043775 A1 | 5/2005 |
| WO | 2006015143 A2 | 2/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915 Completed by the European Patent Office on Mar. 15, 2010, 3 Pages.

Search report and Written Opinion for PCT/IL2008/001282, Both completed by the US Patent Office on Feb. 25, 2009, 9 pages all together.

Search Report and Written Opinion for PCT/IL2008/001347, Both completed by the US Patent Office on Feb. 2, 2009, 10 Pages all together.

Search Report and Written Opinion for PCT/IL2008/001348, Both completed by the US Patent Office on Jan. 28, 2009, 9 Pages all together.

* cited by examiner

BRIDGE SYNCHRONOUS RECTIFIER

CROSS-REFERENCE TO RELATED APPLICATION

This application is based upon and claims the benefit of the filing date of co-pending, commonly assigned U.S. Provisional Patent Application Ser. No. 61/071,151, filed on Apr. 15, 2008, which is incorporated herein by reference in its entirety.

FIELD OF THE INVENTION

The present invention is directed to providing a full-wave rectifier having low power loss characteristics.

BACKGROUND OF THE INVENTION

Power converters are used to interface between power sources and electrical devices. Because alternating current is preferred for efficient power transmission, power sources typically provide power at alternating current. On the other hand the operation of many electrical devices requires direct current. In order to provide direct current for such devices from alternating current, the power sources, power converters need to convert the current supplied from alternating to direct, and use rectifiers for this purpose.

Figure 1A:
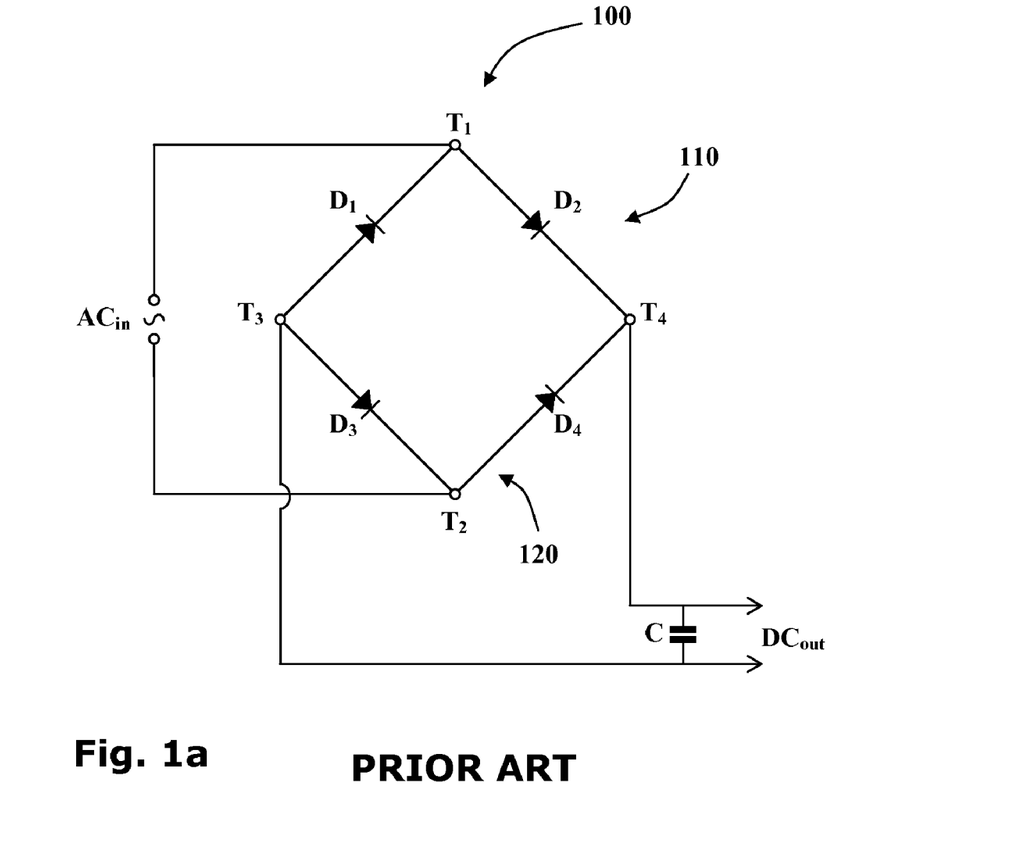
FIG. 1a is a circuit diagram of a full-wave diode bridge rectifier of the prior art.

Bridge rectifiers are commonly used in power converters to provide full-wave rectification of alternating current. A typical bridge rectifier is the Graetz circuit or diode bridge which consists of four diodes arranged in a bridge circuit as shown in FIG. 1a. It will be noted, however, that diodes are inherently inefficient conductors and this produces a number of well known problems.

One problem resulting from the inefficiency of diodes is that they produce a forward voltage drop. This is most noticeable in low-voltage power converters where the voltage drop may be a significant proportion of the desired voltage output. Schottky diodes, which exhibit very low voltage drops, are often used to minimize the problem.

A further problem results from the heat dissipated by diodes, particularly in high frequency switching power supplies. Apart from reducing overall efficiency of the power converter, resulting high temperatures also reduce the reliability of components. Much design effort is typically required to overcome this problem, and other factors such as the dimensions of the system may be compromised as a result.

MOSFETs (Metal Oxide Semiconductor Field-Effect Transistors) are electronic switches. A gate signal may be used to switch the MOSFET between an OFF state and an ON state. In the OFF state, current is blocked whereas in the ON state, a current path is provided between the source and the drain terminals, having the characteristics of an ohmic resistor.

Figure 1B:
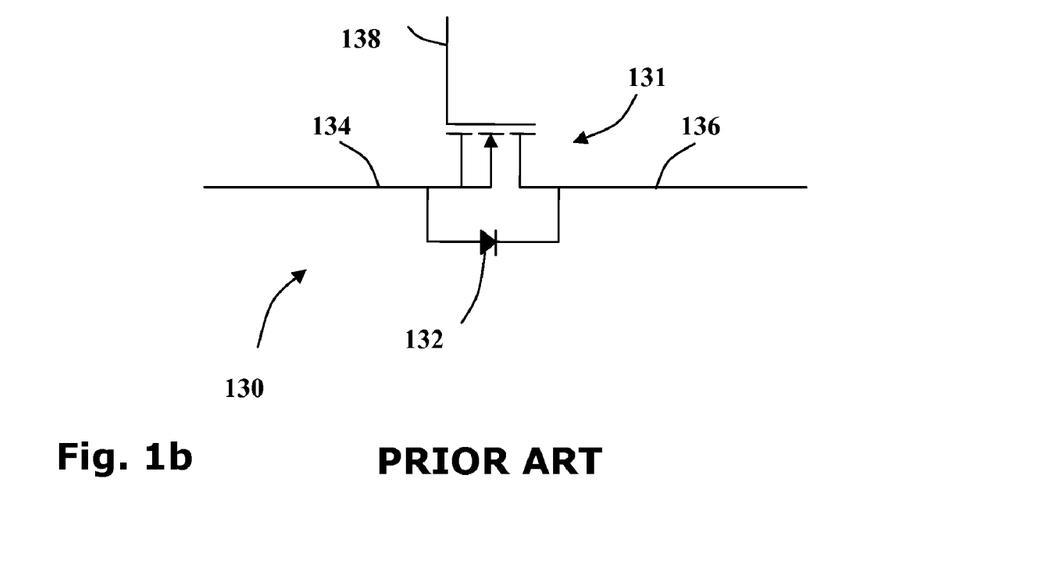
FIG. 1b is a diagram of a Power MOSFET of the prior art.

A prior art Power MOSFET 130 is shown in FIG. 1b. The Power MOSFET 130 consists of an electronic switch 131 having a source terminal 134, a drain terminal 136 and a gate terminal 138, and a diode 132 connected between the source 134 and drain 136 terminals in parallel to the electronic switch 131. When the MOSFET 130 is in the OFF state, current may pass only through the diode 132, however when the MOSFET 130 is in the ON state, an alternative low resistance current path is provided between the source 134 and the drain 136 terminals through the electronic switch 131. Because the closed electronic switch 131 of the MOSFET 130 behaves as an ohmic resistor, it produces less heat loss than the diode 132.

Additionally, it will be noted that MOSFETs have extremely fast switching speeds. This allows them to be used to replace diodes in a rectifier. Typically, the gate signals of the MOSFETs are synchronized with the frequency of the input voltage such that they are switched into their ON state whenever there is a voltage drop between the source 134 and the drain 138 terminals. Such rectifiers are known as synchronous rectifiers and may be used to improve the efficiency of power converters.

In bridge rectifiers, up to two of the diodes of the Graetz circuit may be replaced by MOSFETs, and their gate signal drawn directly from the input voltage. However, if the remaining two diodes are replaced by MOSFETs and also draw gate signals directly from the input voltage, it is difficult to avoid short circuiting between the input and/or the output terminals of the bridge rectifier.

There is a need therefore for a synchronous rectifier characterized by a low associated heat loss and the present invention addresses this need.

SUMMARY OF THE INVENTION

In accordance with a first embodiment, the present invention is directed to providing a current-triggered synchro-rectifier comprising an electronic switch having an anode and a cathode, the electronic switch configured to be in its ON setting when current flowing through the cathode exceeds a predetermined threshold.

Preferably, the electronic switch comprises a MOSFET device that comprises a source terminal, a drain terminal and a gate terminal; a half-wave rectifier in parallel with the MOSFET device, wired to the source terminal and the drain terminal of the MOSFET device, and a current monitor configured to monitor a drain-current flowing through the drain terminal and to send a gate signal to the gate terminal, such that the MOSFET is switched to its ON state when the drain-current exceeds a first threshold current and the MOSFET is switched to its OFF state when the drain-current falls below a second threshold current. Optionally, the current monitor comprises a current transformer.

According to other embodiments of the present invention, a full-wave rectifier is disclosed, comprising:

a first half-wave rectifier having one anode wired to a first output terminal and one cathode wired to a first input terminal;

a second half-wave rectifier having one anode wired to the first output terminal and one cathode wired to a second input terminal;

a third half-wave rectifier having one anode wired to the first input terminal and one cathode wired to a second output terminal; and a fourth half-wave rectifier having one anode wired to the second input terminal and one cathode wired to the second output terminal;

the full-wave rectifier for providing an output of constant polarity from an input of variable polarity, wherein at least one half-wave rectifier comprises the current-triggered synchro-rectifier of the first embodiment.

Alternatively, a full-wave rectifier is disclosed comprising:

a first half-wave rectifier having one anode wired to a first output terminal and one cathode wired to a first input terminal;

a second half-wave rectifier having one anode wired to the first output terminal and one cathode wired to a second input terminal;

a third half-wave rectifier having one anode wired to the first input terminal and one cathode wired to a second output terminal; and a fourth half-wave rectifier having one anode wired to the second input terminal and one cathode wired to the second output terminal;

the full wave rectifier for providing an output of constant polarity from an input of variable polarity, wherein at least one half-wave rectifier comprises an electronic switch configured to be in its ON state when the current flowing through the cathode of the switch exceeds a predetermined threshold.

Preferably, the full-wave rectifier is provided wherein: the first half-wave rectifiers comprises a first electronic switch configured to be in its ON setting when the current flowing through its cathode exceeds a first predetermined threshold, and the second half-wave rectifiers comprises a second electronic switch configured to be in its ON setting when the current flowing through its cathode exceeds a second predetermined threshold. Typically, at least one half-wave rectifier comprises an electronic switch configured to be switched between its ON and OFF states in synchrony with the frequency of the input signal.

In certain embodiments, the full-wave rectifier is provided wherein:

the first half-wave rectifier comprises a first electronic switch configured to be in its ON state when the current flowing through its cathode exceeds a predetermined threshold;

he second half-wave rectifiers comprises a second electronic switch configured to be in its ON state when the current flowing through its cathode exceeds a predetermined threshold;

the third half-wave rectifiers comprises a third electronic switch configured to be switched between its ON and OFF states in phase with the voltage signal at the second input terminal, and the fourth half-wave rectifiers comprises a third electronic switch configured to be switched between its ON and OFF states in phase with the voltage signal at the first input terminal.

Optionally, the electronic switch comprises a transistor. Preferably, the electronic switch comprises a MOSFET device.

Accordingly, a full-wave rectifier is disclosed wherein the electronic switch comprises:

a MOSFET device comprising a source terminal, a drain terminal and a gate terminal;

a half-wave rectifier wired to the source terminal and the drain terminal in parallel with the MOSFET device, and a current monitor configured to monitor a drain-current flowing through the drain terminal and to send a gate signal to the gate terminal such that the MOSFET is switched to its ON state when the drain-current exceeds a first threshold current and the MOSFET is switched to its OFF state when the drain-current falls below a second threshold current.

The current monitor may comprise a current transformer.

In a further embodiment the full-wave rectifier is incorporated into a power converter.

In an additional embodiment the present invention is directed to providing a power converter comprising a full-wave rectifier as described above.

It is according to other embodiments of the invention to present a current-triggered sychro-rectifier incorporated into an LLC resonant converter. Optionally, the current-triggered sychro-rectifier may be incorporated into an implanted medical device, an inductive power receiver comprising a secondary inductor configured to inductively couple with a remote primary inductor or a power harvesting device.

Alternatively, the current-triggered sychro-rectifier may be incorporated into a device comprising at least power generator. Variously, the power generator may be selected from the group consisting of: at least one solar cell, at least one turbo-generator and at least one fuel-cell.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention Only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Reference is now made to FIG. 1a showing a circuit diagram of a typical full-wave rectifier 100 of the prior art. The rectifier has two input terminals $T_1$ and $T_2$ and two output terminals $T_3$ and $T_4$. When an alternating current source $AC_{in}$ is wired to the two input terminals $T_1$ and $T_2$, a direct current output $DC_{out}$ may be drawn from the two output terminals $T_3$ and $T_4$ of the rectifier 100.

Four diodes D1-4 are arranged so that two diodes D1 and D2 form a first branch 110 of a Graetz circuit and the other two diodes D3 and D4 form a second branch 120 of the Graetz circuit. The anodes of two upstream diodes D1 and D3 are wired to the first output terminal T3 and the cathodes of the two downstream diodes D2 and D4 are wired to the second output terminal T4. The cathode of the first upstream diode D1 and the anode of first downstream diode D2 are wired to the first input terminal T1 and the cathode of the second upstream diode D3 and the anode of second downstream diode D4 are wired to the second input terminal T2.

When the polarity of the first input terminal T1 is positive relative to the second input terminal T2, current flows through the first downstream diode D2 and through the second upstream diode D3. When the polarity of the first input terminal T1 is negative relative to the second input terminal T2, current flows through the second downstream diode D4 and through the first upstream diode D1.

Diode bridge rectifiers, such as that shown in FIG. 1a, are used to produce an output with a fixed polarity that is independent of the polarity of the input. Such diode bridge rectifiers may be used in AC-to-DC power converters, for example. Optionally, the output is smoothed by a smoothing capacitor C.

It will be appreciated that power is lost from each diode with each reversal of polarity. In high frequency power converters, where the polarity of the input terminals T1 and T2 may oscillate at a frequencies of 100 kHz or more, such power losses may result in significant heating of the bridge circuit and its surrounding components, which may result in reduced reliability or failure.

Figure 2:
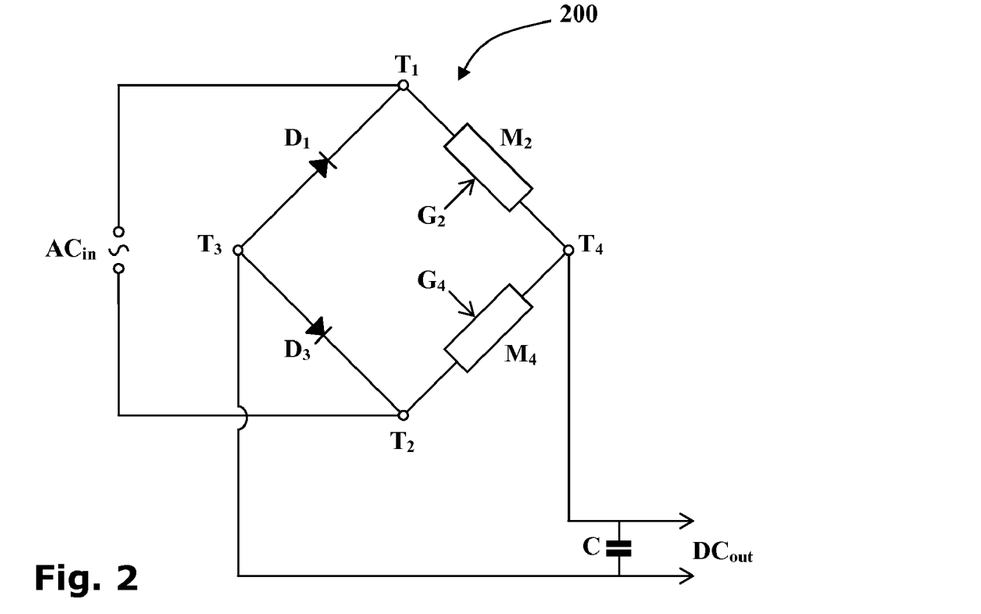
FIG. 2 is a block diagram of a first synchronous full-wave rectifier in which two of the diodes of the diode bridge of FIG. 1 have been replaced by electronic switches.

Power loss may be reduced by replacing diodes with electronic switches, such as the Power MOSFETs shown in FIG. 1b, which have much lower associated power loss. FIG. 2 is a block diagram of one such synchronous full-wave rectifier 200 in which the first downstream diode D2 and the second downstream diode D4 of the diode bridge of FIG. 1a have been replaced by two electronic switches M2 and M4.

The electronic switches M2 and M4 are controlled by switching signals G2 and G4 which switch them between the ON and OFF states. The switching signal G2 controlling the electronic switch M2 must be synchronized to switch to the ON state whenever the polarity of the first input terminal T1 is positive relative to the second input terminal T2. The switching signal G4 controlling the electronic switch M4 must be synchronized to switch to the ON state whenever polarity of the first input terminal T1 is negative relative to the second input terminal T2.

Typically, this synchronization is achieved by drawing the first switching signal G2 from the voltage of the second input terminal T2 and drawing the second switching signal G4 from the voltage of the first input terminal T1.

The above described synchronous full-wave rectifier 200 in which two diodes are replaced by MOSFETs may reduce power loss from the rectifier by up to 50% as compared with the diode bridge rectifier 100 of the prior art. Where further reduction in power loss is required it would be desirable to replace the remaining two diodes D1 and D3 with electronic switches. However, it is much more difficult to synchronize four electronic switches without inadvertently causing short circuits between either the input or output terminals.

Figure 3A:
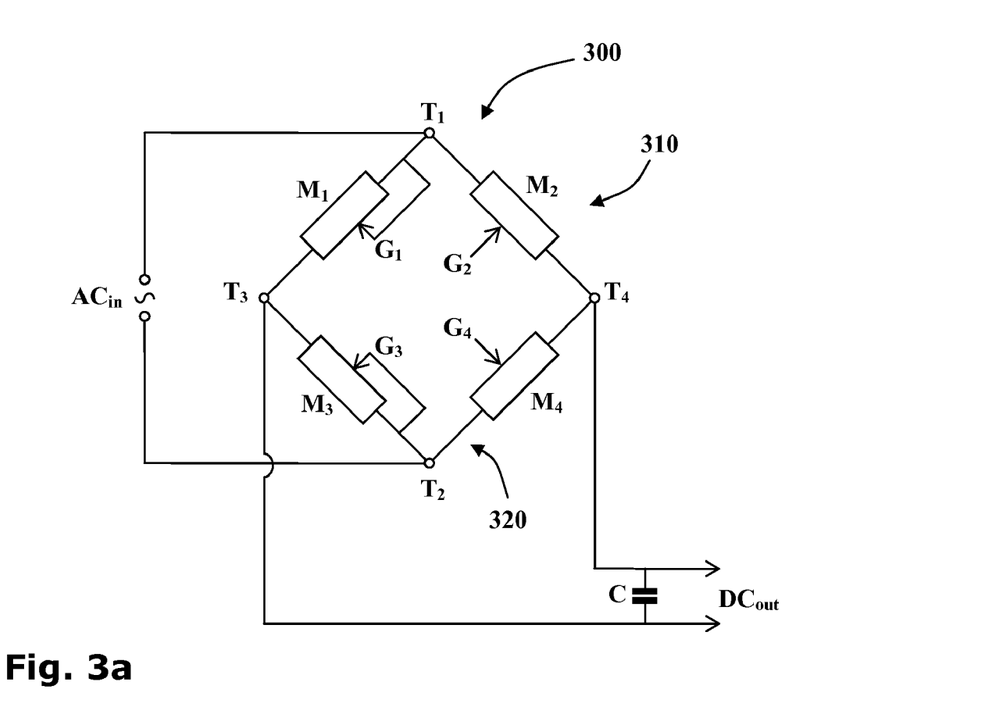
FIG. 3a is a block diagram of a second synchronous full-wave rectifier according to an exemplary embodiment of the invention in which all four diodes of the diode bridge of FIG. 1 have been replaced by electronic switches.

FIG. 3a is a block diagram of a second synchronous full-wave rectifier 300 in which all four diodes D1-4 of the diode bridge of FIG. 1a have been replaced by electronic switches M1-4. In order to provide an output DCout of constant polarity, the switching signals G1-4 need to be carefully controlled.

When the polarity of the first input terminal T1 is positive relative to the polarity of the second input T2, the first upstream and second downstream electronic switches M1 and M4 must be switched to the OFF state and the first downstream and second upstream electronic switches M2 and M3 must be switched to the ON state. When the polarity of the first input terminal T1 is negative relative to the polarity of the second input terminal T2, the first upstream and second downstream electronic switches M1 and M4 must be switched to the ON state and the electronic switches first downstream and second upstream electronic M2 and M3 must be switched to the OFF state.

Synchronization of the switching signals G1-4, is complicated by an additional constraint. In order to prevent shorting across the output terminals, the upstream and downstream electronic switches along a common branch 310, 320 must never be in the ON state at the same time. In practice, when both of the switching signals G1 and G2 controlling the two electronic switches M1 and M2 along the first branch 310 are each drawn from one of the input terminals T1 and T2, the two switches M1 and M2 are periodically both in their ON states. Because the switches M1 and M2 are adjacent along the first branch 310 of the circuit, a short circuit is formed between the output terminals T3 and T4. Similar shorting may occur along the second branch 320 when the switching signals G3 and G4 which control the other two electronic switches M3 and M4 are each drawn from one of the input terminals T1 and T2.

According to preferred embodiments of the invention, only the switching signals G2 and G4 for the downstream electronic switches M2 and M4 are drawn directly from the voltage at the input terminals T1 and T2 whilst the switching signals G1 and G3 for the upstream switches M1 and M3 are controlled independently. Preferably, the switching signals G1 and G3 are responsive to changes in the cathode current of switches M1 and M3 respectively.

Figure 3B:
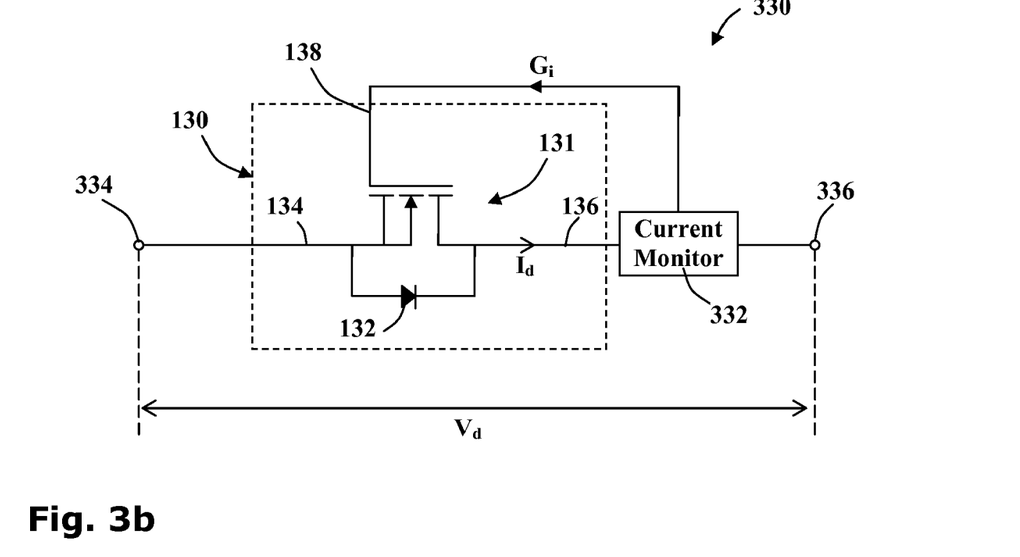
FIG. 3b is a schematic diagram showing a current triggered Power MOSFET which draws a gate signal from the current flowing through its drain terminal.

FIG. 3b shows a current-triggered synchro-rectifier 330 according to an exemplary embodiment of the invention, which may serve as an electronic switch M incorporated into a bridge synchro-rectifier 300. The current-triggered synchro-rectifier 330 includes a Power MOSFET 130, such as that shown in FIG. 1b, and a current monitor 332. The current monitor 332 is wired to the drain terminal 136 of the Power MOSFET 130 and is configured to send a current-based gate signal $G_i$ to the gate terminal 138 of the Power MOSFET when the drain-current Id exceeds a predetermined threshold Ith. Although in the above example the current-triggered synchro-rectifier 330 includes an n-channel MOSFET 130, it will be appreciated that in other embodiments current-triggered synchro-rectifiers may incorporate p-channel MOSFETs.

Figure 3C:
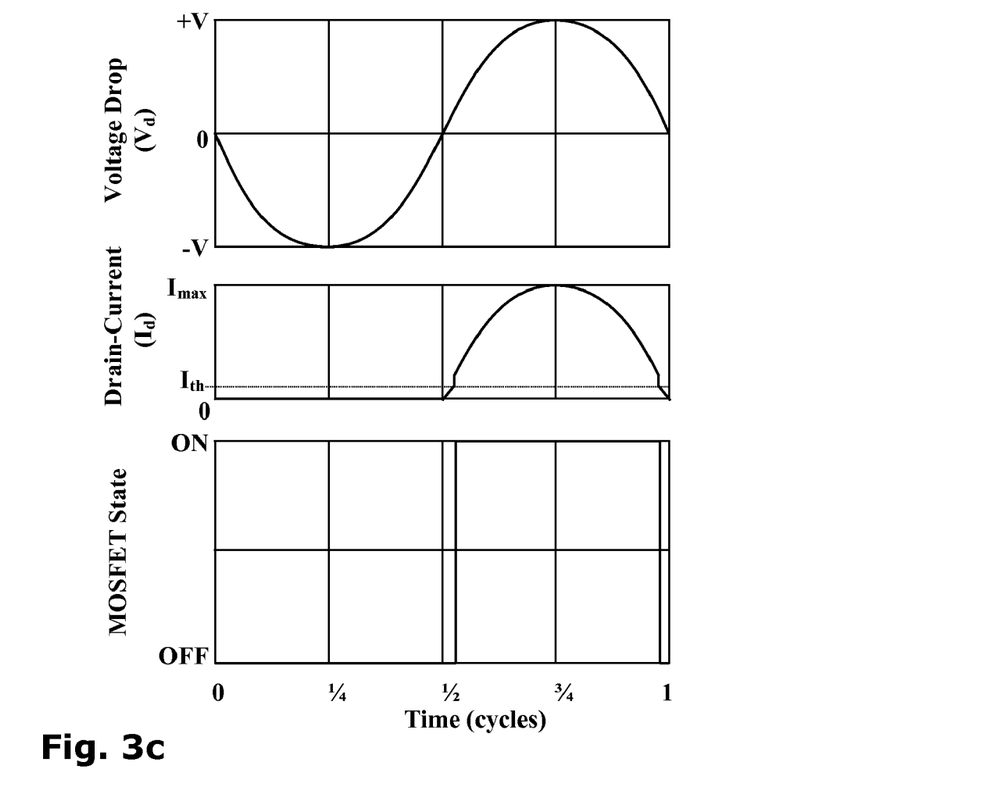
FIG. 3c is a graphical representation of the variations in drain-current and state of the MOSFET of FIG. 3b, over a single cycle of a sinusoidal input voltage.

In order to understand the functioning of the current-triggered synchro-rectifier 330 consider the case where a sinusoidal alternating voltage is connected across the cathode 334 and the anode 336 terminals of the current-triggered synchro-rectifier 330. FIG. 3c shows three graphs showing variations in 1) the voltage drop Vd from the cathode 334 to the anode 336, 2) the drain-current Id, and 3) the MOSFET state during one voltage cycle.

For the first half of the sinusoidal cycle the voltage drop $V_d$ between the cathode 334 and the anode 336 is negative, thus the polarity of the cathode 334 is negative relative to the anode 336. Consequently, no current flows through the drain-terminal 136 and the MOSFET remains in the OFF state.

At the beginning of the second half of the sinusoidal cycle, the voltage drop $V_d$ between the cathode 334 and the anode 336 increases above zero. The polarity of the cathode 334 becomes positive relative to the anode 336 so a small drain-current $I_d$ begins to flow through the diode 132. This current is measured by the current monitor 332.

During the third quarter of the cycle, the voltage drop $V_d$ between the cathode 334 and the anode 336 continues to rise. The current monitor 332 measures an increasing drain-current $I_d$.

When the drain-current $I_d$ exceeds the predetermined threshold $I_{th}$, the current-based gate signal $G_i$ triggers the MOSFET 130 to switch to the ON state.

As long as the MOSFET 130 is in the ON state, current flows through the ohmic conductive path of the electronic switch 131. Consequently, the drain-current $I_d$ varies in proportion to the voltage drop $V_d$.

During the last quarter of the cycle, the voltage drop $V_d$ between the cathode 334 and the anode 336 decreases. The current monitor 332 measures a decreasing drain-current $I_d$.

When the drain-current falls below the predetermined threshold $I_{th}$, the current-based gate signal $G_i$ triggers the MOSFET 130 to switch to the OFF state.

Figure 4:
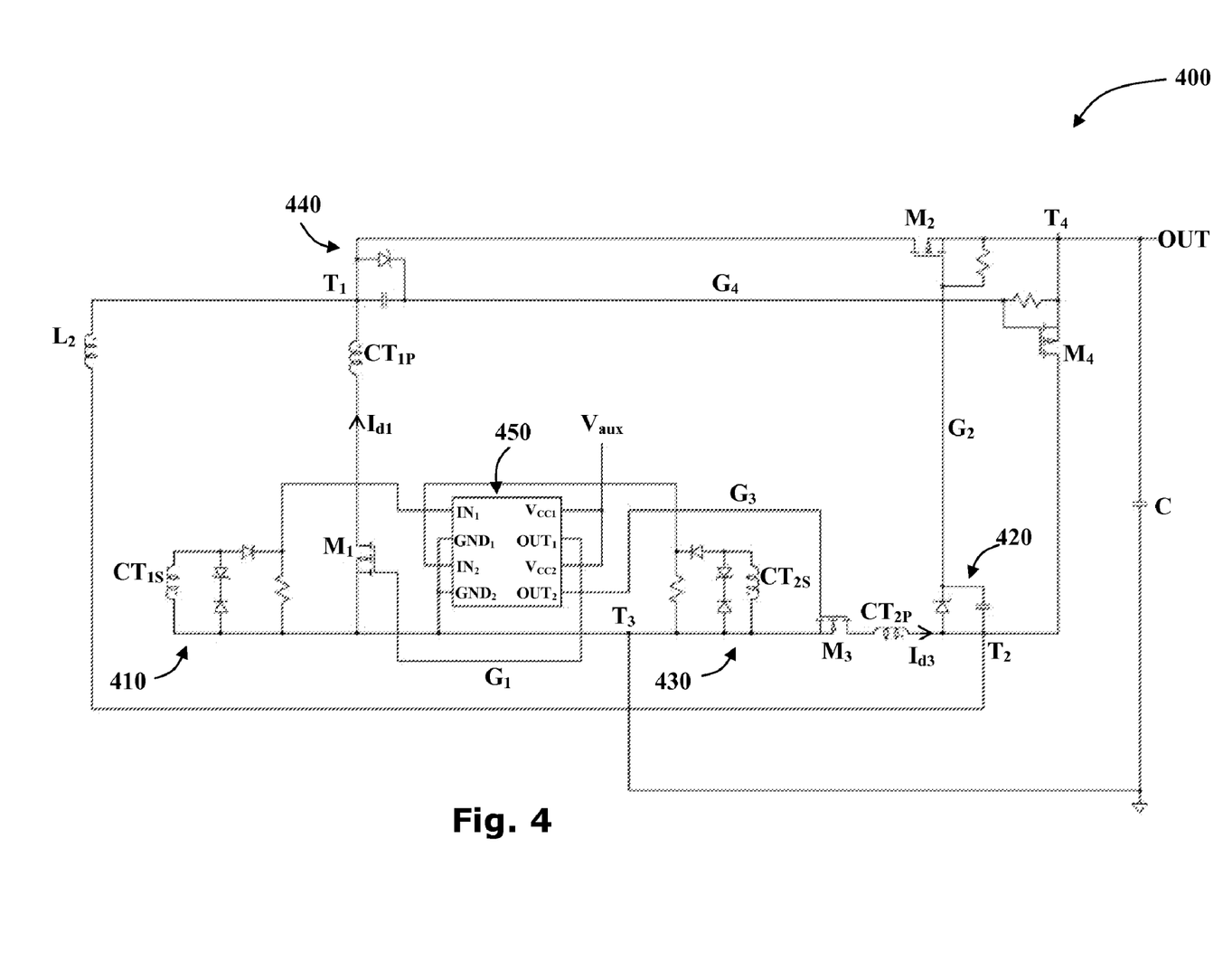
FIG. 4 is a circuit diagram representing a synchronous full-wave MOSFET bridge rectifier according to another embodiment of the invention.

FIG. 4 is a circuit diagram representing a synchronous full-wave bridge rectifier 400 according to an exemplary embodiment of the invention.

The electronic switches M1-4 of the exemplary embodiment are all MOSFET transformers having three terminals: a source terminal, a drain terminal and a gate terminal. The upstream MOSFETs M1 and M3 are both n-channel MOSFETs and their source terminals are both wired to the first output terminal T3 of the rectifier. The downstream MOSFETs M2 and M4 are both p-channel MOSFETs and their source terminals are both wired to the second output terminal T4 of the rectifier. The drain terminals of the first upstream MOSFET M1 and the first downstream MOSFET M2 are both wired to the first input terminal T1 of the rectifier and the drain terminals of the second upstream MOSFET M3 and the second downstream MOSFET M4 are both wired to the second input terminal T3 of the rectifier.

The input terminals T1 and T2 are wired to a secondary coil L2 of a power transformer which is inductively coupled to a primary coil (not shown). The secondary coil L2 provides an alternating current input to the two input terminals T1 and T2.

The gate terminals of the downstream MOSFETs M2 and M4 are wired to the input terminals T2 and T1 via smoothing circuits 420, 440 respectively. The switching signals G2 and G4, are therefore out of phase with each other.

The gate terminals of the upstream MOSFETs M1 and M3 receive switching signals G1 and G3 driven by their own drain-currents Id1 and Id3. The drain current Id1 of the first upstream MOSFET M1 is monitored by a first current transformer 410, in which a primary current monitor coil CT1P transfers the current signal to a secondary current monitor CT2S the output of which is rectified and relayed to a first input IN1 of a driver 450 which amplifies the signal before outputing a signal from a first output OUT1. This first output signal from the driver is then fed back to the first upstream MOSFET M1 such that when the drain current Id1 exceeds a threshold value the MOSFET M1 switches itself to the ON state. This produces a switching signal G1 at the same frequency as the alternating current input ACin.

Similarly the drain current Id3 of the second upstream MOSFET M2 is monitored by a second current transformer 430, in which a primary current monitor coil CT2P transfers the current signal to a secondary current monitor CT2S the output of which is rectified and relayed to a second input IN2 of the driver 450 which amplifies the signal before outputing a signal from a second output OUT2. The second output signal from the driver is then fed back to the second upstream MOSFET M3 such that when the drain current Id2 exceeds a threshold value the MOSFET M3 switches itself to the ON state. This produces a switching signal G3 at the same frequency as the alternating current input ACin.

Although in the example hereabove, current transformers 410, 430 are used to monitor the drain-currents Id1, Id2, in alternative embodiments other current monitors such as ammeters, galvanometers, Hall effect sensors or the like may be preferred.

It will be appreciated that embodiments of the present invention may be useful in a wide range of applications, in particular where rectification of alternating current is required. For example, in receivers adapted to receive power from inductive power providers. Inductive power receivers may be used to wirelessly provide power for a variety of electrical devices. Embodiments of the present invention may be integrated into such inductive power receivers, particularly where low heat losses are necessary or high power is required by the electrical device, for example. Thus embodiments of the current invention may be of particular use when incorporated within power tools, kitchen appliances, bathroom appliances, computers, media players, office equipment and the like, which may require high power for operation.

The reduced heat loss, associated with sychro-rectifiers of embodiments of the invention, is particularly useful when heat dissipation is difficult for example when power receiver has small dimensions or for heat-sensitive equipment such as measuring devices. Also, it is desirable that devices implanted into a living body do not dissipate large amounts of heat into the body. Therefore, the low heat losses associated with the synchro-rectifier, make it particularly suited to implanted devices, such as pace makers, trackers and the like.

It is also noted that in recent years public concern about the threat of a global energy crisis has resulted in a greater emphasis being placed upon optimizing the efficiency of energy transfer. It is difficult to achieve more demanding specifications using existing technology and increasingly, new topologies such as LLC resonant converters are being adopted. It will be appreciated that such topologies require rectification and the diodes typically used may be readily replaced with more efficient sychro-rectifiers. In this context, embodiments of the present invention may be used to provide high powers with very low energy losses. Consequently the current invention is an important element in the drive for greater efficiency.

Furthermore embodiments of the present invention may be advantageously utilized in inductive power transfer systems in which power is transferred from a primary coil to a remote secondary coil. The further the secondary coil is situated from the primary coil, the lower the voltage which is induced in the secondary coil. The aforementioned voltage drop associated with traditional diodes is particularly problematic is such settings. Amongst others, such applications include:

medical applications in which power is transferred remotely to devices implanted in a patient, communications with remote RFID tags, military application in which power is transferred across thick armored plating, communication or inductive energy transfer to secondary inductive coils buried underground, communication or inductive energy transfer to secondary inductive coils submerged under water, for example in submarine applications, and communication or inductive energy with secondary coils which are moving relative to the primary coil.

Other applications, in which low voltage drop associated with the synchro-rectifier is advantageous, include power harvesting applications in which low power devices such as watches, remote controls, wireless alarms etc. Power harvesting devices use ambient power from radio waves, for example, to charge a local power store. Embodiments of the present invention may significantly reduce energy losses in such sensitive applications.

Still further applications include solar cells which may be used to generate low voltage electricity, typically at 0.5V. The voltage drop, associated with traditional diodes may be problematic and may require a number of solar cells to be connected in series to generate higher initial voltages. Embodiments of the synchro-rectifier having lower voltage drops may be preferred in such applications. Similarly, the synchro-rectifier may be applied to prevent voltage drops from turbo-generators, fuel-cells and the like.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed:

1. A full-wave rectifier configured to convert an AC input to a DC output comprising;
a first input terminal;
a second input terminal;
a first output terminal; and
a second output terminal;
wherein said full-wave rectifier further comprises:
a first half-wave rectifier comprising;
  i. a first MOSFET device having a source terminal wired to said first output terminal, a drain terminal wired to said first input terminal, and a gate terminal;
  ii. a fifth half-wave rectifier in parallel with said first MOSFET device, wired to the source terminal and the drain terminal of the first MOSFET device;
  iii. a first current monitor configured to monitor a drain-current flowing through the drain terminal of the first MOSFET device and to send a gate signal to the gate terminal of the first MOSFET device such that the first MOSFET device is switched to its ON state when said drain-current exceeds a first threshold current and the first MOSFET device is switched to its OFF state when said drain-current falls below a second threshold current;
a second half-wave rectifier comprising;
  i. a first MOSFET device having a source terminal wired to said first output terminal, a drain terminal wired to said first input terminal, and a gate terminal;
  ii. a fifth half-wave rectifier in parallel with said first MOSFET device, wired to the source terminal and the drain terminal of the first MOSFET device;
  iii. a first current monitor configured to monitor a drain-current flowing through the drain terminal of the first MOSFET device and to send a gate signal to the gate terminal of the first MOSFET device such that the first MOSFET device is switched to its ON state when said drain-current exceeds a first threshold current and the first MOSFET device is switched to its OFF state when said drain-current falls below a second threshold current;
a third half-wave rectifier having one anode wired to said first input terminal and one cathode wired to a second output terminal; and
a fourth half-wave rectifier having one anode wired to said second input terminal and one cathode wired to said second output terminal.

2. The full-wave rectifier of claim 1 wherein at least one the first MOSFET device is configured to be switched between its ON and OFF states in synchrony with the frequency of the input signal.

3. The full-wave rectifier of claim 1 wherein:
said third half-wave rectifiers is configured to be switched between its ON and OFF states in phase with the voltage signal at said second input terminal, and
said fourth half-wave rectifiers is configured to be switched between its ON and OFF states in phase with the voltage signal at said first input terminal.

4. The full-wave rectifier of claim 3 wherein at least one of said third half-wave rectifier and said fourth half-wave rectifier comprises a transistor.

5. The full-wave rectifier of claim 3 wherein at least one of said third half-wave rectifier and said fourth half-wave rectifier electronic switch comprises a MOSFET device.

6. The full-wave rectifier of claim 3 wherein at least one of said third half-wave rectifier and said fourth half-wave rectifier comprises:
a MOSFET device comprising a source terminal, a drain terminal and a gate terminal;
a half-wave rectifier wired to said source terminal and said drain terminal in parallel with said MOSFET device, and
a current monitor configured to monitor a drain-current flowing through said drain terminal and to send a gate signal to said gate terminal such that said MOSFET is switched to its ON state when said drain-current exceeds a first threshold current and said MOSFET is switched to its OFF state when said drain-current falls below a second threshold current.

7. The full-wave rectifier of claim 6 wherein said current monitor comprises a current transformer.

8. The full-wave rectifier of claim 1 incorporated into a power converter.

9. A power converter comprising the full-wave rectifier of claim 1.

10. The full wave rectifier of claim 1 incorporated into an LLC resonant converter.

11. The full-wave rectifier of claim 1 incorporated into an implanted medical device.

12. The full-wave rectifier of claim 1 incorporated into an inductive power receiver comprising a secondary inductor configured to inductively couple with a remote primary inductor.

13. The full-wave rectifier of claim 1 incorporated into a power harvesting device.

14. The full wave rectifier of claim 1 incorporated into a device comprising at least power generator.

15. The full-wave rectifier of claim 14 wherein said power generator is selected from the group consisting of: at least one solar cell, at least one turbogenerator and at least one fuel-cell.

16. The full-wave rectifier of claim 1 wherein at least one of said fifth half-wave rectifier and said sixth half-wave rectifier comprises a diode.

17. The full wave rectifier of claim 6 wherein said half-wave rectifier comprises a diode.

18. The full-wave rectifier of claim 1 wherein at least one of said first current monitor and said second current monitor comprises a current transformer.

* * * * *